United States Patent [19]

Takigawa

[11] Patent Number: 4,668,301

[45] Date of Patent: May 26, 1987

[54] METHOD OF AND APPARATUS FOR WASHING AIRCRAFT

[75] Inventor: Noboru Takigawa, Kenji Fujita, Katsumi Kawase, Takahiro Higaken, Yokohama, all of Japan

[73] Assignee: Sumitomo Heavy Industries, Ltd., Tokyo, Japan

[21] Appl. No.: 770,922

[22] Filed: Aug. 30, 1985

[30] Foreign Application Priority Data

Mar. 29, 1985 [JP] Japan ................................ 60-65182

[51] Int. Cl.⁴ .............................................. B60S 3/06
[52] U.S. Cl. ................................. 134/6; 15/DIG. 2; 15/53 A
[58] Field of Search ............... 15/53 A, 53 AB, 53 R, 15/97 B, DIG. 2; 134/6

[56] References Cited

U.S. PATENT DOCUMENTS

| | | | |
|---|---|---|---|
| 3,460,177 | 8/1969 | Rhinehart | 15/53 A |
| 3,551,934 | 1/1971 | Franzreh | 15/97 |
| 3,601,832 | 8/1971 | Cook | 15/53 A |
| 3,665,542 | 5/1972 | Franzreb | 15/98 |
| 3,775,798 | 12/1973 | Thornton-Trump | 15/53 A |
| 3,835,498 | 9/1974 | Arato | 15/53 A |

FOREIGN PATENT DOCUMENTS 0188796 11/1983 Japan ................... 15/53 A

Primary Examiner—Edward L. Roberts
Attorney, Agent, or Firm—Armstrong, Nikaido, Marmelstein & Kubovcik

[57] ABSTRACT

An apparatus for washing an aircraft has a turn table situated on the ground and capable of turning while carrying at least the main wheels of the aircraft. The apparatus further has a main washing carriage having a length substantially equal to the length of the aircraft and disposed at one side of the turn table such as to extend in parallel with the axis of the aircraft. The main washing carriage is movable in the direction perpendicular to the axis of the aircraft towards and away from the aircraft. The apparatus also has a plurality of washing devices carried by the main washing carriage for movement in the longitudinal direction of the main washing carriage, the washing devices having washing units accessible to predetermined different regions of the side of the aircraft carried by the turn table. In operation, after the aircraft to be washed is stationed on the turn table, the main washing carriage is moved towards the aircraft so that the washing devices on the main washing carriage wash respective regions on the side of the aircraft adjacent the main washing carriage. Then, the main washing carriage is moved away from the aircraft and the turn table is rotated 180° to make the unwashed side of the aircraft accessible, and the main washing carriage approaches the aircraft again to allow the washing devices to wash the unwashed side of the aircraft.

15 Claims, 21 Drawing Figures

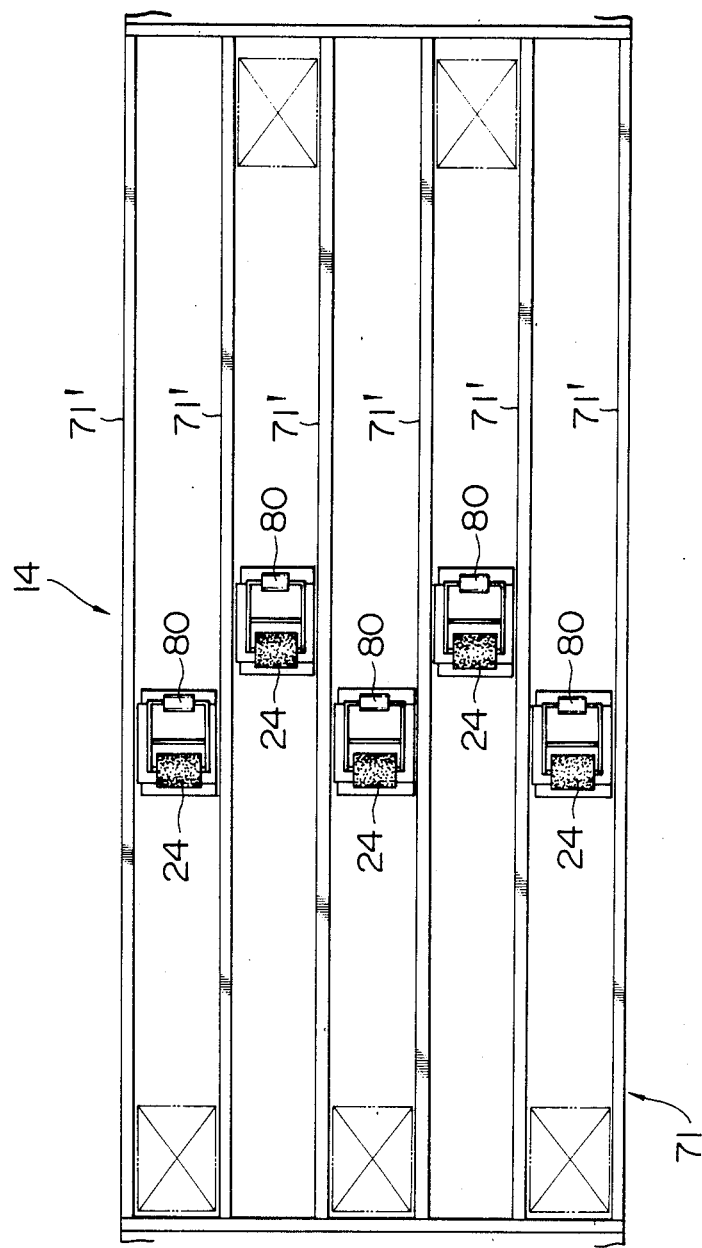

METHOD OF AND APPARATUS FOR WASHING AIRCRAFT

BACKGROUND OF THE INVENTION

1. Field of the Invention

The present invention relates to a method of and an apparatus for mechanically washing large-sized aircraft.

2. Description of the Prior Art

Hitherto, washing of aircraft has been conducted manually by workers. In case of large-sized aircraft such as Jumbo Jet airliners, the washing is quite laborious and time consuming: namely, it takes 3 to 4 hours to complete the washing by about 20 workers.

Actually, however, the washing has to be done in a short time after the necessary maintenance work which is conducted while the aircraft is waiting for the next flight in an airport. Therefore, it is often experienced that the aircraft cannot be washed completely due to too short a turn round time.

The periodic and frequent washing of aircraft is quite important from the view points of good appearance of the aircraft, prevention of rust and elongation of life of paint, as well as for reduction of fuel consumption through a reduction in air resistance.

Under these circumstances, there is an increasing demand for a mechanical facility which is capable of washing aircraft by only a few workers in a short time of, for example, 1 hour.

To cope with this demand, the present inventors have already proposed an aircraft washing method and apparatus in co-pending U.S. patent application Ser. No. 722,972 filed on Apr. 12, 1985.

Basically, the method disclosed in the above-mentioned patent application employs a turn table for stationing an aircraft thereon, and a number of washing brush units which are adapted to wash local portions of the aircraft while changing their postures in accordance with the configuration of the aircraft. In operation, the turn table is rotated slowly such as to progressively vary the areas covered by the washing brushes, so that the whole of the aircraft is washed completely while the turn table makes one full rotation.

It is true that this method can appreciably shorten the washing time as compared with the conventional manual washing method. However, considering that only a few washing brush units are employed and that each brush unit can cover only a limited area in a given time, there still is the possibility of the washing time being further shortened.

SUMMARY OF THE INVENTION

Accordigly, an object of the invention is to provide a method of and an apparatus for washing aircraft in a short time by means of a comparatively simple arrangement.

Basically, the invention of this application makes use of a part of the advantages brought about by the preceding invention proposed in the above-mentioned patent application in that it employs a turn table. According to the invention, the aircraft to be washed is divided into a plurality of washing regions. These washing regions of different shapes are adapted to be washed by different brush-type washing devices which are designed to follow-up the shapes peculiar to respective regions. According to this arrangement, different washing regions of an aircraft can be washed simultaneously so that the washing time can be shortened remarkably.

More specifically, according to one aspect of the invention, there is provided a method of washing an aircraft comprising: bringing the aircraft onto a turn table situated on the ground and stationing the aircraft on the turn table such that at least main wheels of the aircraft rest on the turn table; moving a main washing carriage in the direction perpendicular to the axis of the aircraft, the main washing carriage being disposed at one side of the aircraft on the turn table and carrying a plurality of washing devices which are provided with washing units accessible to predetermined different regions of the surface of the aircraft, thereby washing at once the regions on one side of the aircraft adjacent the main washing carriage by means of the washing devices; moving the main washing carriage to a position away from the aircraft; turning the turn table carrying the aircraft 180°; and moving the main washing carriage again towards the aircraft thereby allowing the washing devices to wash at once the regions on the unwashed side of the aircraft.

According to another aspect of the invention, there is provided an apparatus for washing an aircraft comprising: a turn table situated on the ground and capable of turning while carrying at least main wheels of the aircraft on predetermined positions thereon; a main washing carriage having a length substantially equal to the length of the aircraft and disposed at one side of the turn table such as to extend in parallel with the axis of the aircraft carried by the turn table, the main washing carriage being movable in the direction perpendicular to the axis of the aircraft towards and away from the aircraft; and a plurality of washing devices carried by the main washing carriage for movement in the longitudinal direction of the main carriage, the washing devices having washing units accessible to predetermined different regions of the side of the aircraft adjacent the main washing carriage.

By virtue of the features set forth above, a half area of an aircraft can be washed by a single washing operation of the washing devices and, after 180° turning of the turn table, the other half part is washed in the same way. Thus, the whole of the aircraft can be washed by two cycles of washing operation, so that the washing time can be shortened remarkably as compared with the invention disclosed in the patent application mentioned before.

The above and other objects, features and advantages of the invention will become clear from the following description of the preferred embodiment when the same is read in conjunction with the accompanying drawings.

BRIEF DESCRIPTION OF THE DRAWINGS

FIGS. 15, 16 and 17 are a plan view, a front elevational view and a side elevational view of a wing lower surface washing device incorporated in the apparatus of the invention;

DESCRIPTION OF THE PREFERRED EMBODIMENT

Figure 1:
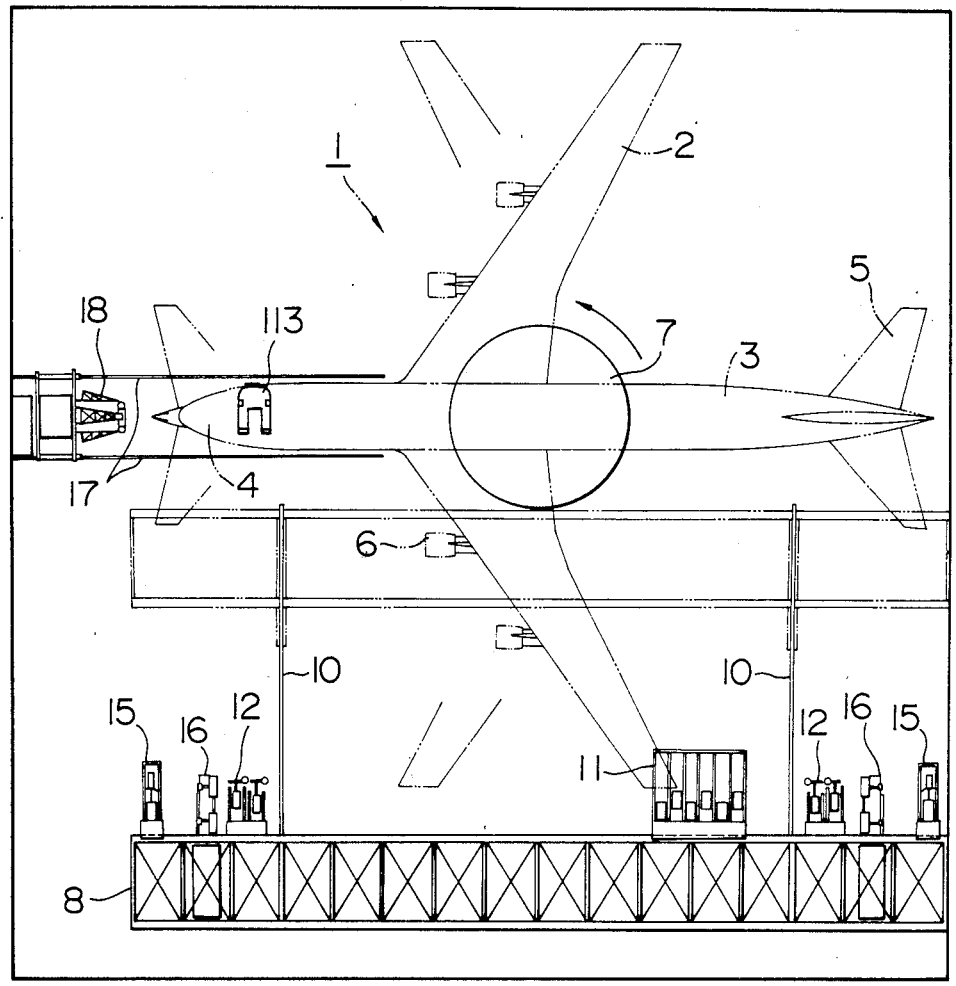
FIGS. 1 and 2 are a plan view and a front elevational view showing the whole of an aircraft washing apparatus in accordance with the invention.
Figure 2:
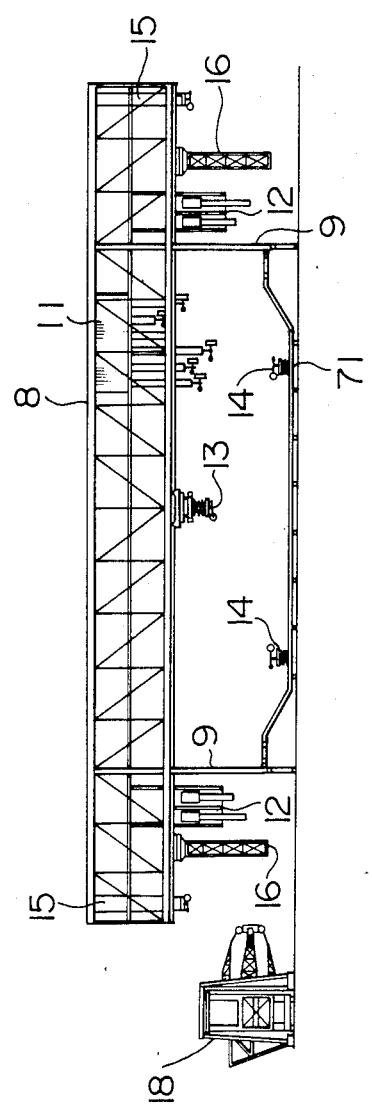

FIGS. 1 and 2 are a plan view and a front elevational view of the whole of an aircraft washing apparatus in accordance with the invention. The apparatus has a turn table 7 situated on the ground, such that an aircraft generally designated at a numeral 1 can be stationed on the turn table as illustrated. A main washing carriage 8 having a truss-type structure is disposed at one side of the turn table 7 such as to extend in parallel with the longitudinal axis of the aircraft. The turn table 7 is sized such that, when the aircraft is stationed with its center substantially coinciding with the center of the turn table as shown by two-dot-and-dash line, the turn table 7 can carry at least the main wheels of the aircraft.

The main washing carriage 8 has a length equal to or greater than the overall length of the aircraft to be washed and is supported horizontally at its left and right end portions by a pair of supporting frames 9, 9 which are provided at their lower ends with wheels. The wheels are adapted to run on a pair of rails 10, 10 which are laid on the ground such as to extend perpendicularly to the longitudinal axis of the aircraft, so that the main washing carriage can be movable towards and away from the fuselage 3 of the aircraft 1 on the turn table 7.

In order that the main washing carriage 8 can approach the fuselage 3 of the aircraft 1, the supporting frames 9, 9 have a length which is large enough to permit the bridge portion of the main washing carriage to clear the main wing 2 of the aircraft 1.

The main washing carriage 8 carries a plurality of washing devices which are movable along the main washing carriage 8 in the longitudinal direction of the main washing carriage. These washing devices are: an upper fuselage washing device 11 for washing the upper part of the fuselage 3 of the aircraft, a lower fuselage washing device 12 for washing the lower part of the fuselage 3, a main wing upper surface washing device 13 for washing the upper surface of the main wing 2, a main wing lower surface washing device 14 for washing the lower surface of the main wing, a vertical and horizontal tail plane upper surface washing device 15 for washing the vertical tail plane and the upper surface of the horizontal tail plane 5, and a tail plane lower surface washing device 16 for washing the lower surface of the horizontal tail plane.

On the other hand, a pair of rails 17, 17 are laid on the ground near the turn table 7 such as to extend in the direction of the longitudinal axis of the aircraft stationed on the turn table 7. A nose washing device 18 for washing the nose 4 of the aircraft 1 is adapted to run along the rails 17, 17 towards and away from the nose 4.

Each washing device has a plurality of washing units each of which includes a rotary washing brush and a suitable number of water jet nozzles. The number of the washing units on the washing device varies depending on the area which is to be covered by the washing device. Each washing device has a carrier which is movable along the main washing carriage 8 or the rails 17, 17. The washing units are carried by the carrier for free adjustment or change in the position, height and the posture so as to meet the configuration of the region to be washed.

For an easier understanding of the description, symbols X, Y and Z are used to represent, respectively, the direction parallel to the longitudinal axis of the aircraft, the horizontal direction orthogonal to the longitudinal axis, and the vertical direction perpendicular to the longitudinal axis. Since the carriers of all washing devices move in the X-direction, these carriers will be referred to as "X-carriages", hereinunder. Similarly, terms "Y-carriage" and "Z-carriage" will be used to represent later-mentioned carriers which are adapted to move in the Y- and Z-directions, respectively. Suffixes such as Y and Z attached to other terms show that the parts or members expressed by these terms move in Y- and Z-directions, respectively.

Figure 3:
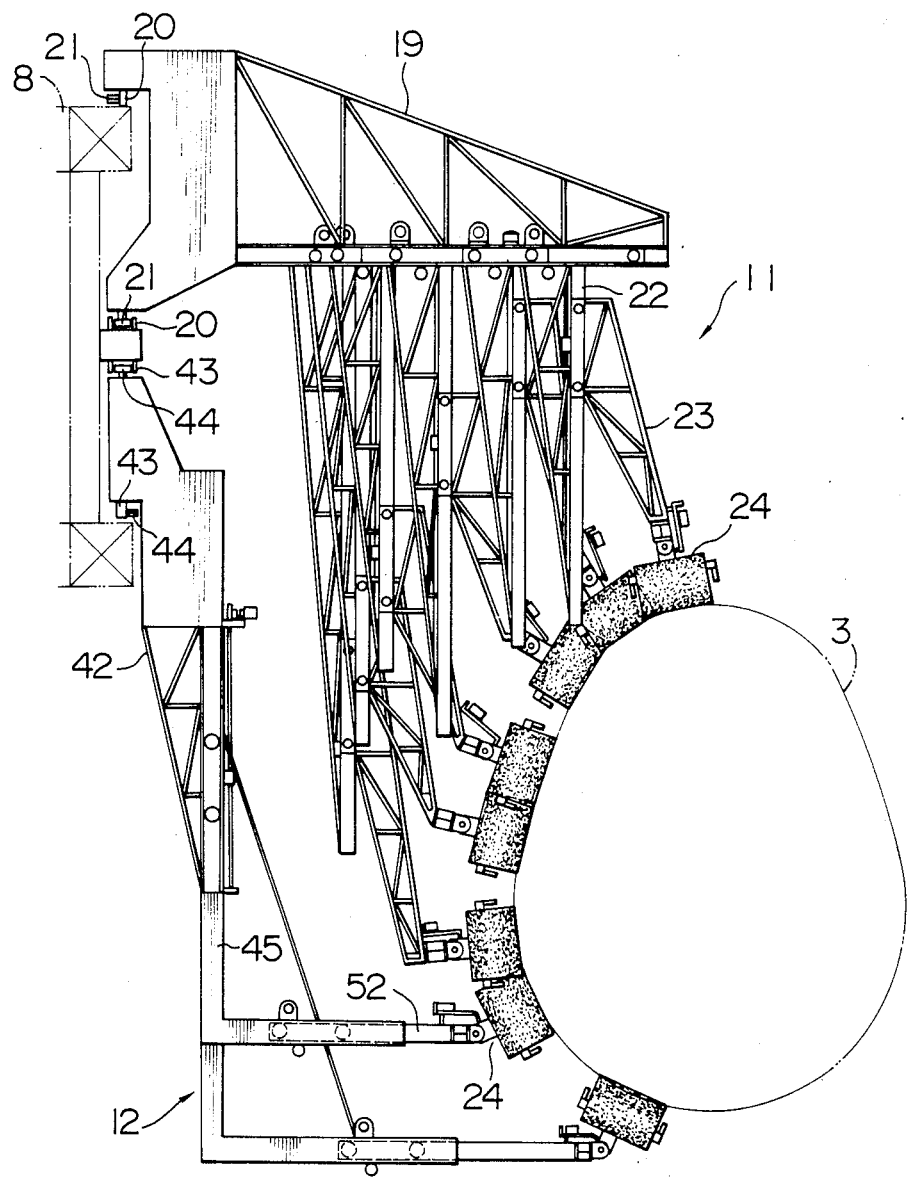
FIG. 3 is a side elevational view of an example of an upper fuselage washing device and a lower fuselage washing device incorporated in the washing apparatus in accordance with the invention.
Figure 4:
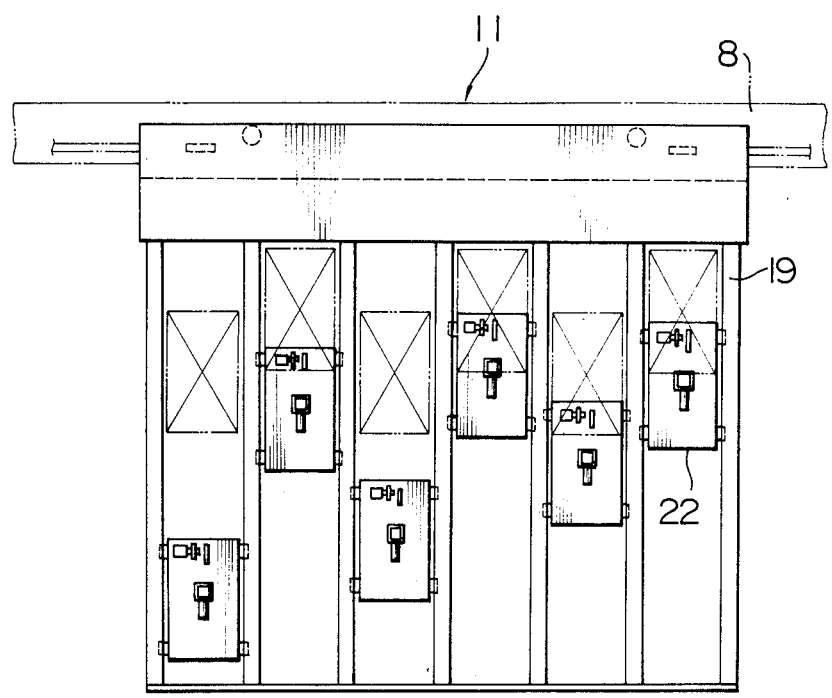
FIGS. 4 and 5 are a plan view and a front elevational view of the upper fuselage washing device.
Figure 5:
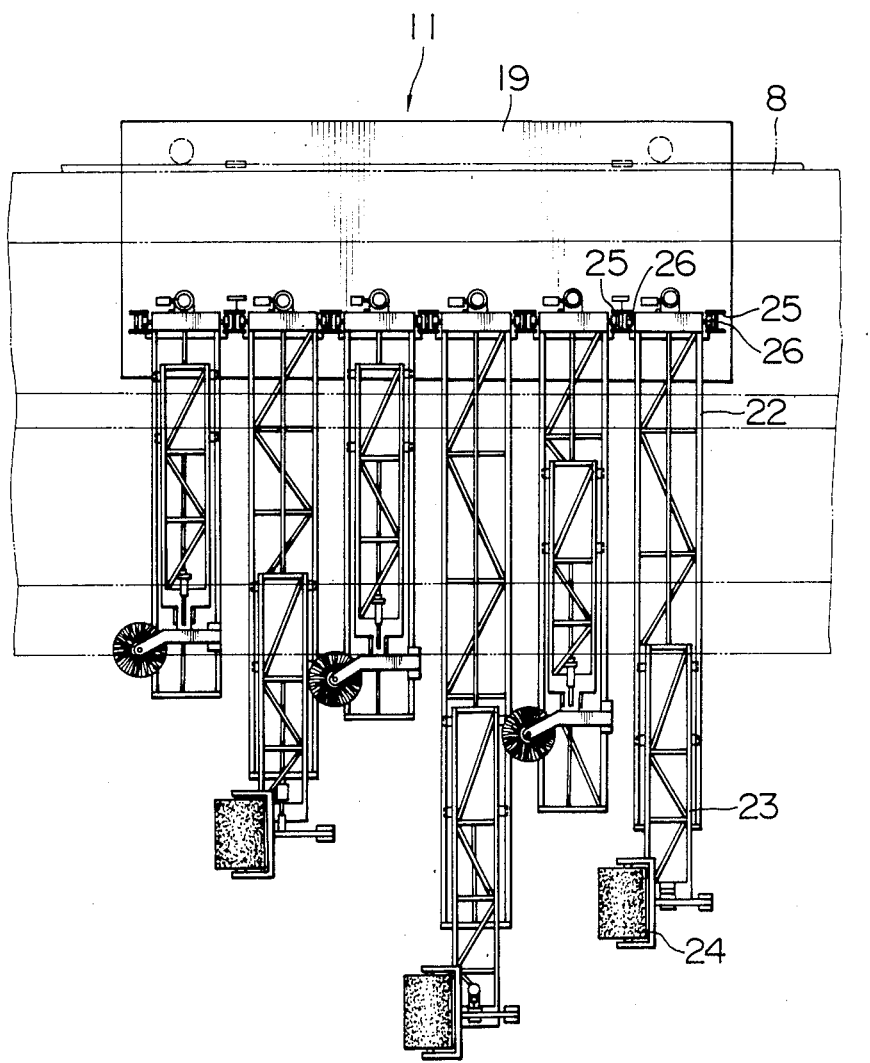

The upper fuselage washing device 11 is adapted to run along the main washing carriage 8 at least over the region of the aircraft fuselage 3 except the nose 4 and the region where tail planes 5 exist. FIGS. 3, 4 and 5 are enlarged side elevational, plan and front elevational views of the upper fuselage washing device 11. This device 11 has a truss-type X-carriage which in turn is provided with wheels 21, 21 which are adapted to roll on rails 20, 20 laid on a top girder of the main washing carriage 8 and an intermediate girder provided at an intermediate height of the washing carriage 8, so that the X-carriage 19 can run in the X-direction by means of an electric motor (not shown) which drives the wheels 21, 21.

The X-carriage 19 carries a plurality of Y-carriages adapted to run on the X-carriage 19 in the Y-direction. In the illustrated embodiment, there are 6 (six) Y-carriages on the X-carriage 19. Each Y-carriage 22 carries a truss-type Z-carriage which is capable of moving in the Z-direction. The washing unit 24 mentioned before is pivotally secured to the lower end of the Z-carriage 23.

Figure 6:
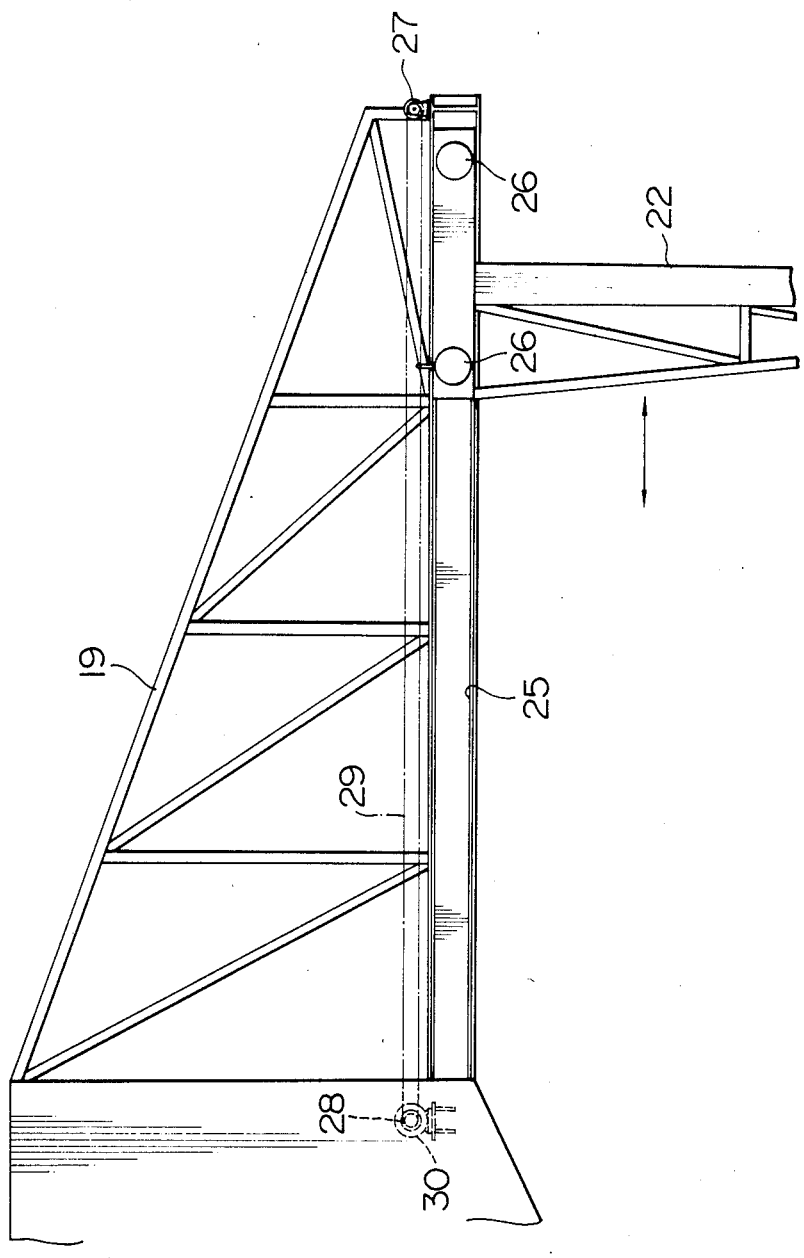
FIGS. 6 and 7 are enlarged side elevational views showing an essential portion of the upper fuselage washing device shown in FIG. 3.

A plurality of rails 25, each being constituted by an H-section steel girder, are attached to the underside of the X-carriage 19 such as to extend in the Y-direction. Each Y-carriage is provided at its upper end with wheels 26 which engage two adjacent rails 25. As shown in detail in FIG. 6, a chain 29 goes round sprockets 27 and 28 secured to the X-carriage 19 such as to extend above the pair of rails 25. The Y-carriage 22 is connected at its upper portion to the chain 29. The arrangement is such that the Y-carriage 22 is moved back and forth in the Y-direction as the sprocket 28 is driven by a motor 30 with a reduction gear.

Figure 7:
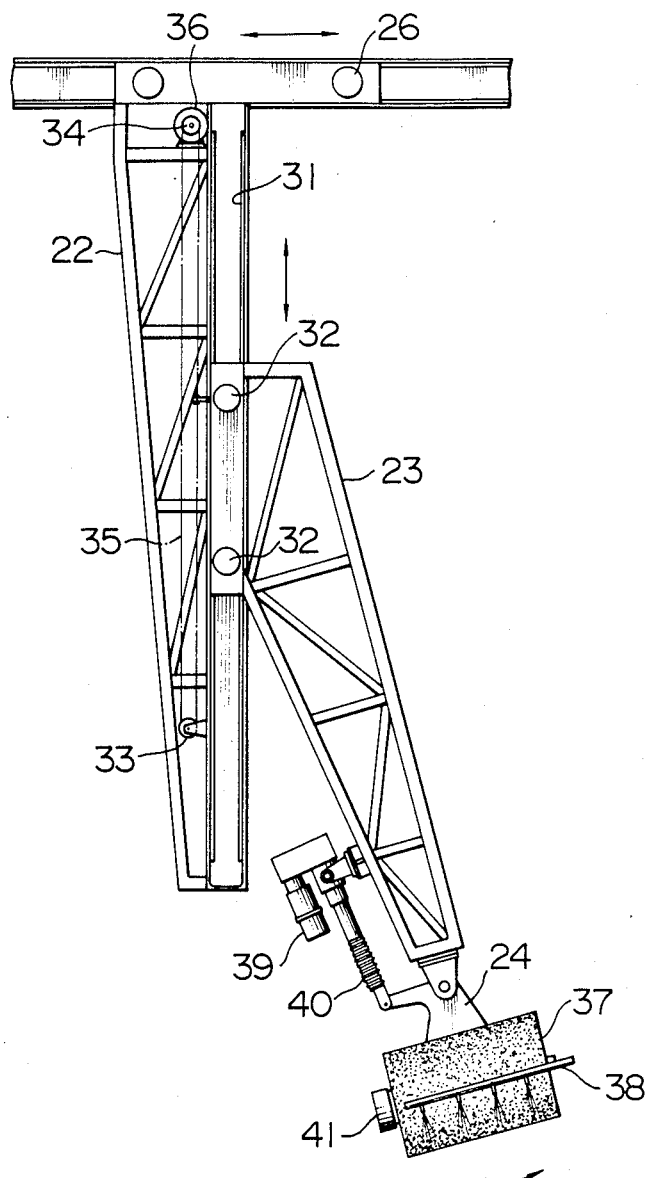

Referring now to FIG. 7, the Z-carriage 23 is provided with wheels 32 which engage with a pair of rails 31 each of which being made of an H-section steel girder and secured to one side of the Y-carriage 22. The Z-carriage 23 is connected to a chain 35 which extends in parallel with the rails 31 between sprockets 33, 34 secured to the Y-carriage 22. Therefore, as the sprocket 34 is driven by a motor 36 with a reduction gear, the Z-carriage 23 moves up and down in the Z-direction.

Each washing unit 24 is constituted by a rotary brush 37 and a water jetting device 38 having nozzles arranged on both sides of the rotary brush. The arrangement is such that the angle of the rotation axis of the rotary brush 37 with respect to the Z-carriage is adjustable by the action of a rod 40 which is adapted to be extended and retracted by the operation of an electric motor 39. A reference numeral 41 designates an electric motor for driving the rotary brush 37.

The fuselage lower surface washing device 12 is adapted to wash the lower portion of the fuselage 3 other than the nose 4 and the portion where the tail planes 5 exist, as in the case of the fuselage upper surface washing device 11. The fuselage lower surface washing device 12 is arranged in a pair: namely, a device for washing the front part of the fuselage and a device for washing the rear part of the fuselage, because this device cannot move longitudinally of the fuselage in such a way as to clear the main wing 2.

Figure 8:
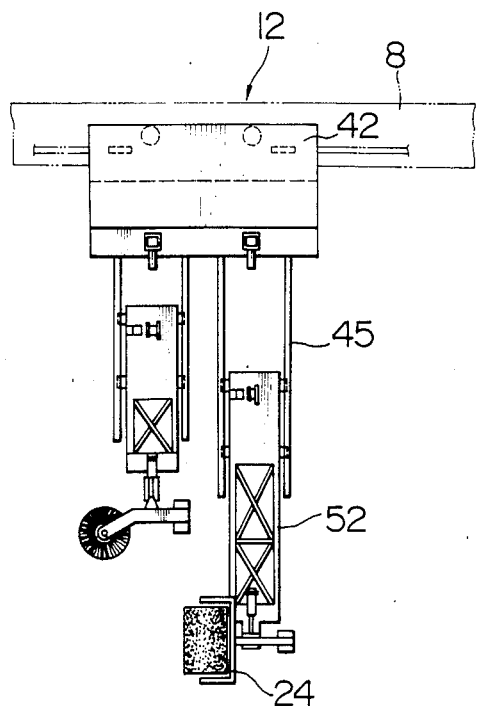
FIGS. 8 and 9 are a plan view and a front elevational view of the lower fuselage washing device shown in FIG. 3.
Figure 9:
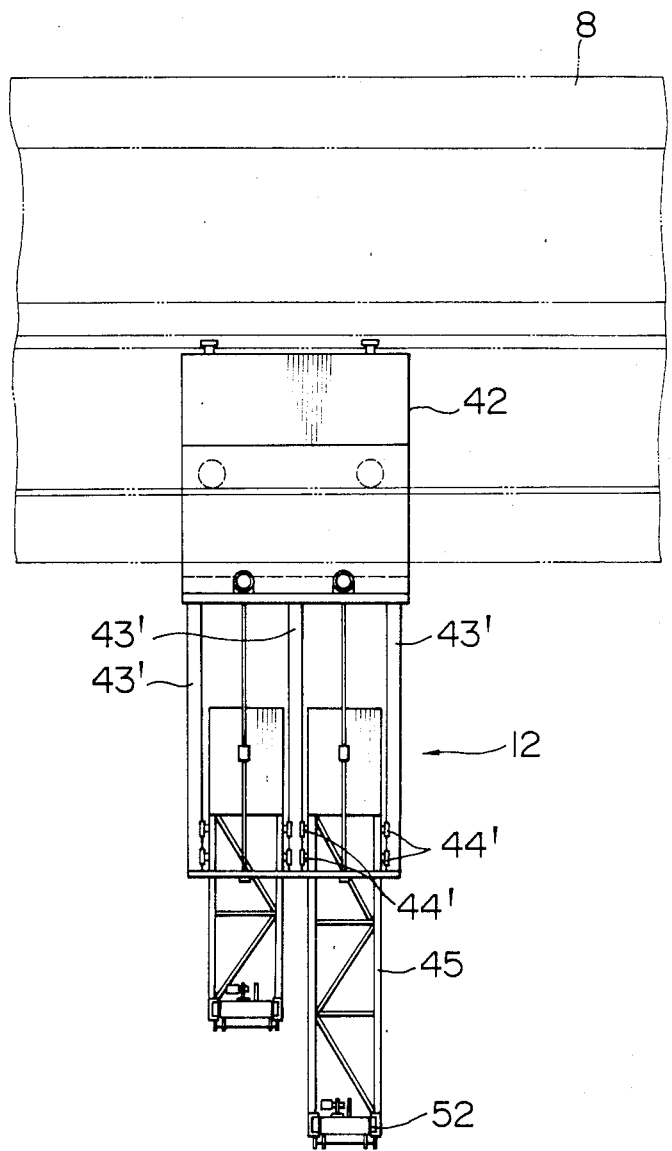

The construction of the fuselage lower surface washing device will be explained hereinunder with reference to FIGS. 3, 8 and 9. A X-carriage 42 of a truss-type structure has wheels 44, 44 adapted to roll on rails 43, 43 which are laid along the side of the main washing carriage 8 adjacent to the turn table 7 at a middle and a lower part of the main carriage 8. The arrangement is such that the X-carriage 42 of the fuselage lower surface washing device 12 takes a position lower than the X-carriage 19 of the fuselage upper surface washing device 11 and can move in the longitudinal direction of the main washing carriage 8, as the wheels 44, 44 are driven by an electric motor (not shown).

Figure 10:
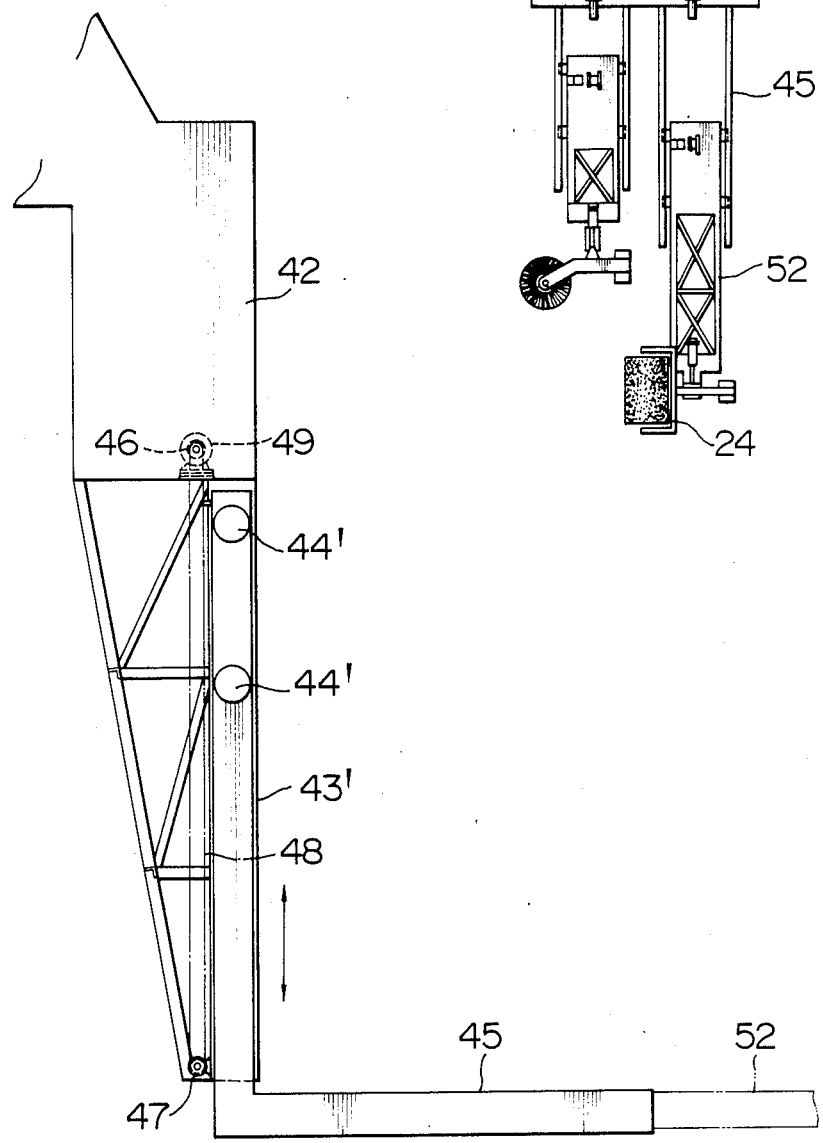
FIGS. 10 and 11 are enlarged views of an essential portion of the lower fuselage washing device shown in FIG. 3.

A plurality of rails 43′ made of an H-section steel girder are secured vertically to one side of the X-carriage 42. In the illustrated embodiment, there are three rails 43′. The fuselage lower surface washing device 12 has a plurality of vertically movable Z-carriage 45, each having wheels 44′ engaging with two adjacent rails 43′, 43′. In the illustrated embodiment, there are two Z-carriages 45. Each Z-carriage 45 is provided with an L-shaped frame having a vertical portion to which the wheels 44′ are attached. As shown in FIG. 10, the Z-carriage 45 is secured to a chain 48 which goes round sprockets 46 and 47 secured to the X-carriage 42. The arrangement is such that the Z-carriage 45 is movable up and down as the sprocket 46 is driven by a motor 49 with a reduction gear.

Figure 11:
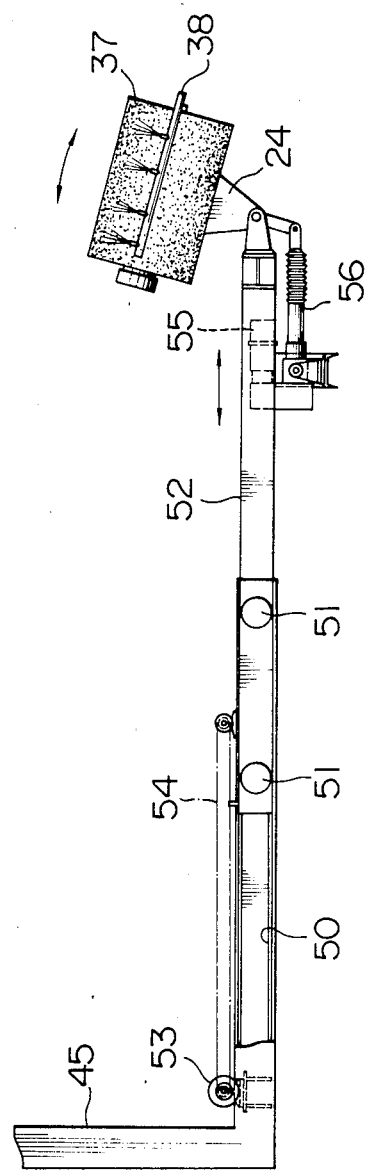

As shown in detail in FIG. 11, each Z-carriage 45 of the fuselage lower surface washing device is provided at its horizontal portion with a pair of rails 50 constituted by H-section steel girders. A Y-carriage 52 has wheels 51 engaging with the rails 50. Thus, the Y-carriage 52 extends horizontally between the rails 50. The Y-carriage 52 is adapted to be moved in the Y-direction by means of a chain 54 which in turn is driven by a motor 53 with a reduction gear. A washing unit 24 having a rotary brush 37 and a water spray device 38 is pivotally secured to the end of the Y-carriage 52. As in the case of the fuselage upper surface washing device 11, the angle of the rotary brush 37 can be adjusted by means of rod 56 which is driven by an electric motor 55.

Figure 12:
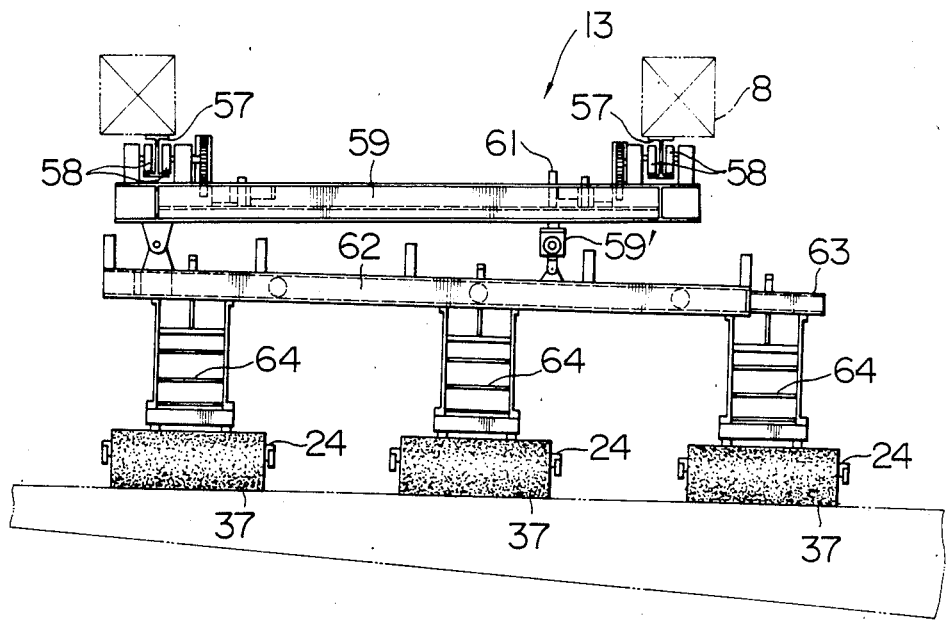
FIGS. 12, 13 and 14 are a side elevational view, a front elevational view and a plan view showing the detail of an example of a wing upper surface washing device incorporated in the apparatus of the invention.
Figure 13:
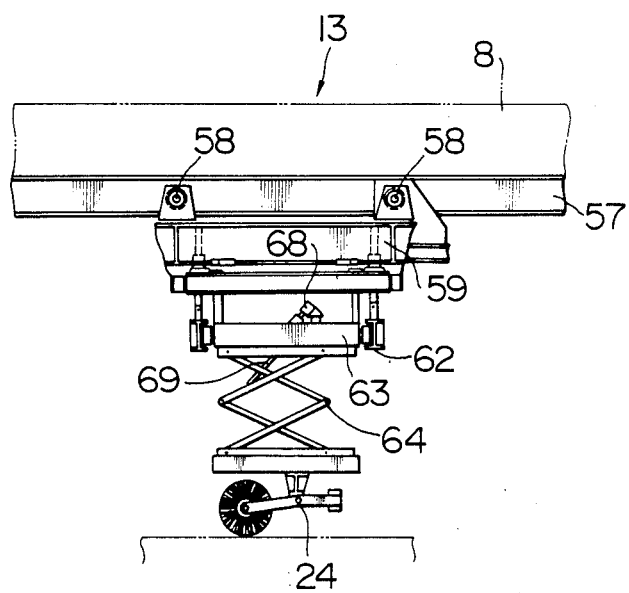
Figure 14:
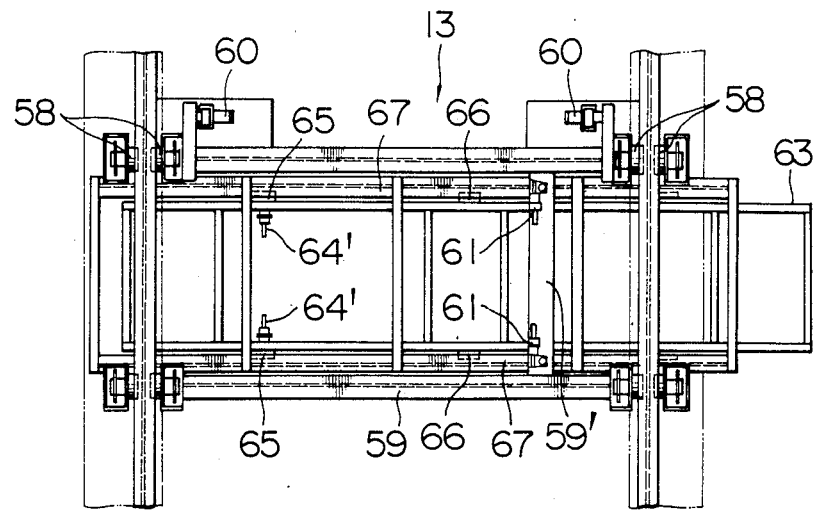

As will be seen from FIGS. 12, 13 and 14, the main wing upper surface washing device 13 has a X-carriage 59 having wheels 58, 58 which are adapted to roll on rails 57, 57 made of H-section steel girders secured to both lower edges of the main carriage 8. More specifically, two pairs of wheels 58 are arranged for each rail 57 such that two wheels of each pair are arranged on respective sides of the web of the associated rail. Thus, the X-carriage 59 has eight wheels in total. The wheels 58 arranged on the inner side of the rails 57 are driven by a hydraulic motor 60 with a reduction gear, so that the X-carriage 59 runs along the rails 57. A tiltable boom 62 is pivotally secured at its one end to the underside of the X-carriage 59 such that the tilting angle is adjusted by means of a jack 61 provided on a cross beam 59′ suspended from the X-carriage 59. A Y-carriage 63 is adapted to move in the Y-direction along the tiltable boom 62. Three washing units 24 are secured to the underside of the Y-carriage 63 through table lifters 64. The Y-carriage 63 has a pair of driving wheels 65, 65 and a pair of idle wheels 66, 66. As the driving wheels 65, 65 are driven by a hydraulic motor 64′ with a reduction gear, the Y-carriage 63 runs along rails 67, 67 secured to both sides of the tiltable boom 62. The table lifter 64 is constituted by a link mechanism having a construction resembling a pantograph, and is adapted to be extended and retracted by means of a rod 69 which in turn is driven by an electric motor 68. Three washing units are arranged such that the rotary brushes 37 of adjacent washing units are spaced from each other by a distance corresponding to the length of the rotary brush 37.

The main wing lower surface washing device 14 has a plurality of X-carriage 70. In the illustrated embodiment, five X-carriage 70 are used. These X-carriage 70 are adapted to run along a plurality of pairs of rails 71′ formed on a rail frame 71 extended at a level near the ground between left and right supporting frames 9 and 9 of the main carriage 8.

Figure 16:
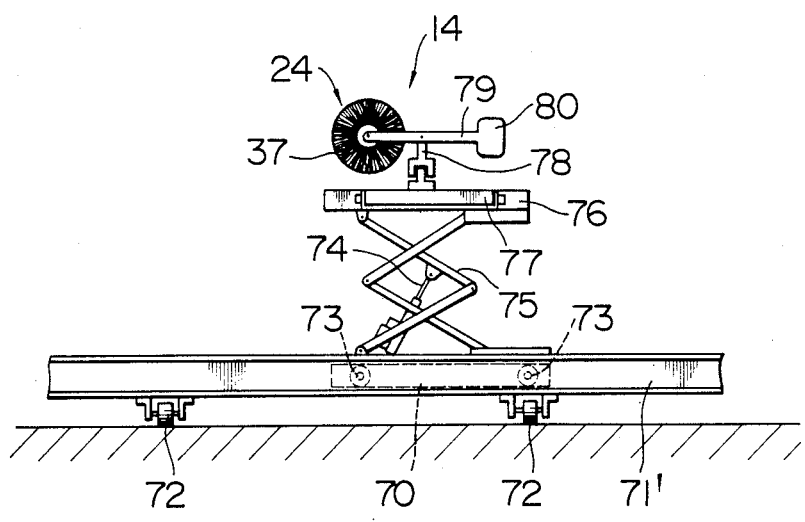
Figure 17:
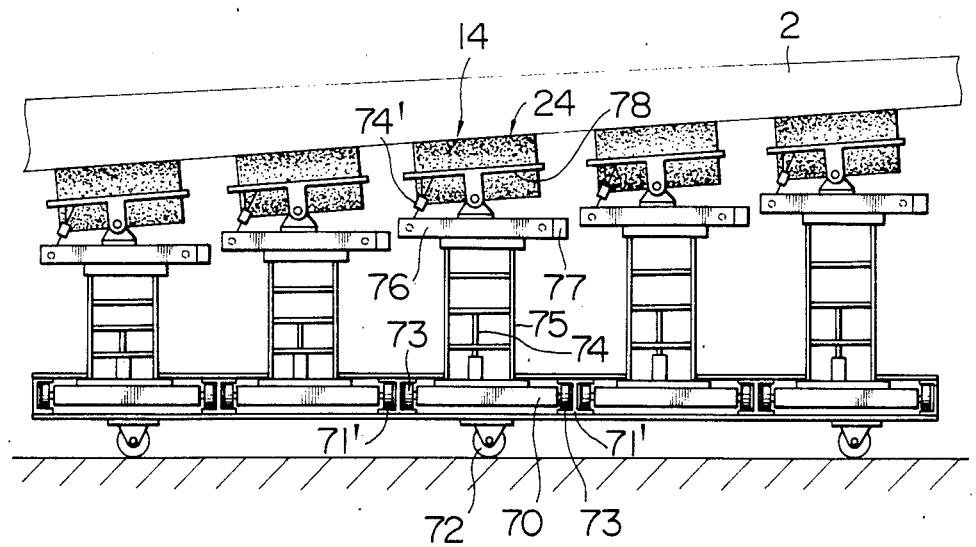

The main wing lower surface washing device 14 will be explained in more detail with specific reference to FIGS. 15, 16 and 17. The rail frame 71 which is constituted by six rails 71′ of H-section steel girders is secured at both its ends to the supporting frames 9, 9 of the main washing carriage 8. At the same time, a plurality of tire wheels 72 contacting the ground surface and rotatable in the direction perpendicular to the rails 71′ are attached to the underside of the rail frame 71. Each X-carriage 70 has wheels 73 provided on both sides thereof and adapted to run along adjacent rails 71′. A Z-carriage 76 is carried by each X-carriage 70 through a pantograph-type table lifter 75 which is extensible and retractable in Z-direction by the action of a rod 74 driven by an electric motor. A Y-carriage 77 has wheels which are driven by a hydraulic motor with a reduction gear such as to run in a Y-direction along a rail carried by the Z-carriage 76 and extending in a Y-direction. A tiltable bar 78 is pivotally secured at its mid portion to a bracket on the Y-carriage 77. A washing unit 24 is secured to the tiltable bar 78. As in the case of the tiltable boom 62 of the main wing upper surface washing device 13, the tilting angle of the tiltable bar 78 is adjustable by means of a hydraulic cylinder 74′. The washing unit 24 is substantially of the same type as that used in the washing devices mentioned hereinbefore. This washing unit 24, however, has a balancing weight 80 secured to the rear end of an arm 79 which is provided at its front end with the rotary brush 37 and pivotally supported at its mid portion by a tiltable bar 78, so that the rotary brush 37 is pressed with a moderate pressure to the surface which is being washed. The five sets of main wing lower surface washing devices 14, when they are not operating, are stationed at storage positions which are provided at staggered ends of the rail frame 71 has indicated by two-dot-and-dash line.

Figure 18:
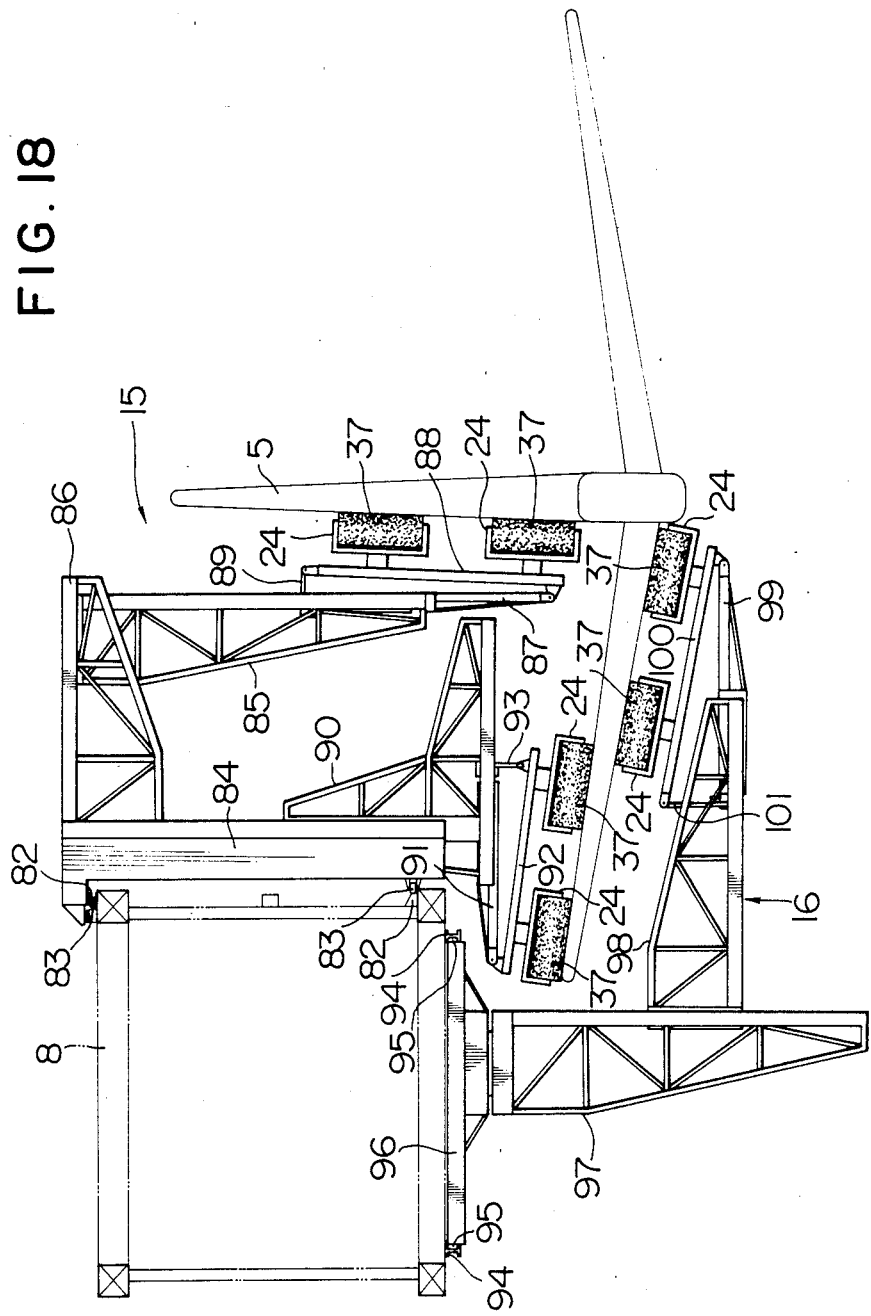
FIG. 18 is a side elevational view showing the detail of an example of a vertical and horizontal tail plane upper surface washing device and a tail plane lower surface washing device.

FIG. 18 shows in larger scale a vertical and horizontal tail plane upper surface washing device 15 and a tail plane lower surface washing device 16. As will be seen from FIGS. 1 and 2, the washing devices 15 and 16 are arranged in a pair at each side of the main washing carriage 8. The vertical and horizontal tail plane upper surface washing device 15 has a X-carriage 84 provided with wheels 83, 83 which engage with the rails 82, 82 provided along the upper and lower edges of the main washing carriage 8 adjacent the turn table 7 at each end of the washing carriage 8. The X-carriage 84 carries a washing unit for the vertical tail plane and a washing unit for the upper surface of the horizontal tail planes. More specifically, a Y-carriage 85 for the vertical tail plane has wheels which engage with rails mounted on a frame 86 projecting horizontally from the upper end of the X-carriage 84, so that the Y-carriage 85 can run in the Y-direction. The Y-carriage 85 carries vertical rails along which a Z-carriage 87 is movable up and down through wheels attached thereto. A pair of washing units 24 are secured to a tiltable boom 88 which is pivotally connected to the lower end of the Z-carriage 88. The tilting angle of the tiltable boom 88 is adjustable by means of a rod 89 driven by an electric motor, such that the brush 37 follows the surface of the vertical tail plane. Some of the wheels 83 on the X-carriage 84 are adapted to be directly driven by an electric motor. The Y-carriage 85 and the Z-carriage 87 are adapted to be driven by means of a sprocket-chain mechanism of the same type as that used for the driving of the upper fuselage washing device 11 and the lower fuselage washing device 12.

The X-carriage 84 is further provided with vertical rails. A Z-carriage for the upper surface of the horizontal tail planes has wheels adapted to roll on these rails, so that the Z-carriage 90 is movable up and down along these rails. The Z-carriage 90 has a frame-type construction assembled in a form like L. A Y-carriage 91 has wheels engaging with rails attached to the horizontal portion of the frame structure, so that the Y-carriage 91 is movable horizontally along the rails. A pair of washing units 24 are secured to a tiltable boom 92 which in turn is pivotally connected to the left end of the Y-carriage 91. The tilting angle of the tiltable boom 92 is adjustable by the action of a rod 93 such that the rotary washing brushes 37 fit the inclination of the upper surface of the horizontal tail plane. The Z- and Y-carriages 90 and 91 for the upper surface of the horizontal tail planes are driven by means of a sprocket-and-chain type mechanism.

On the other hand, the tail plane lower surface washing device 16 has a X-carriage 96 having wheels 95, 95 adapted for engagement with rails 94, 94 secured to the underside of each end of the main washing carriage 8. Some of the wheels 95 are driven directly by electric motors such as to drive the X-carriage 96. A frame 97 is suspended from the underside of the X-carriage 96 for rotation about a vertical axis. A Z-carriage 98 is movable up and down along vertical rails secured to the frame 97. A Y-carriage 99 is horizontally movable back and forth with respect to the Z-carriage 98. A pair of washing units 24 are attached to a tiltable boom 100 which in turn is pivotally attached to the end of the Y-carriage 99. The tilting angle of the tiltable boom 100 is adjustable by the action of a rod 101 driven by an electric motor, in conformity with the inclination of the underside of the horizontal tail plane. The Z-carriage 98 and the Y-carriage 99 are driven by sprocket-and-chain type mechanism similar to that for the tail plane upper surface washing device 15.

Figure 19:
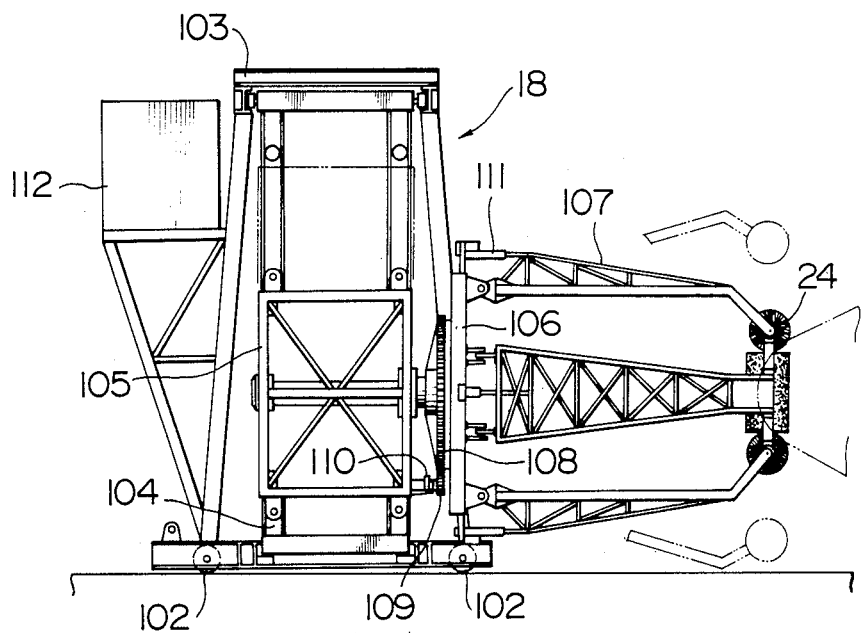
FIGS. 19, 20 and 21 are a side elevational view, a plan view and a front elevational view showing the detail of an example of a nose washing device incorporated in the apparatus of the invention.
Figure 20:
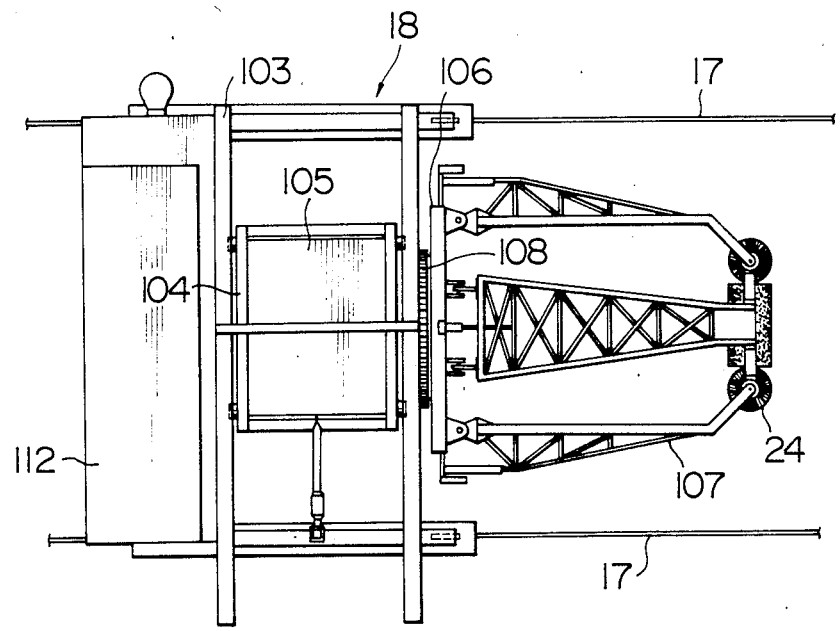
Figure 21:
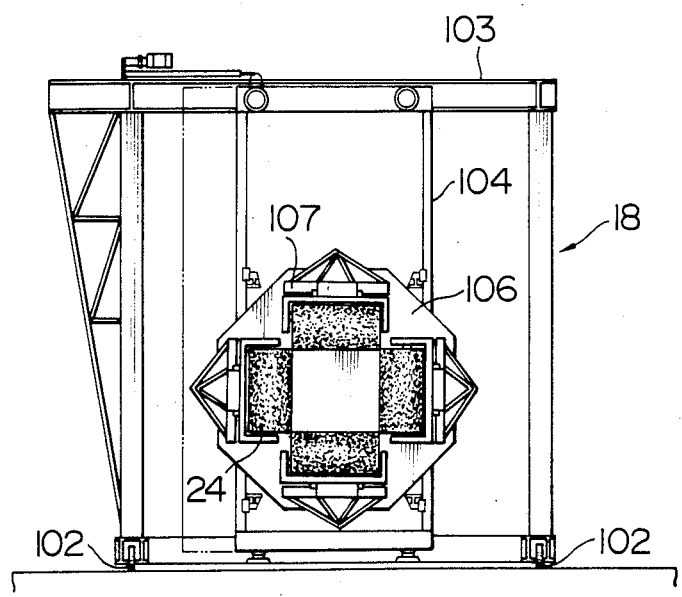

FIGS. 19, 20 and 21 are a side elevational view, plan view and a front elevational view showing the detail of the nose washing device 18. As explained before in connection with FIG. 1, rails 17, 17 are laid on the ground such as to extend towards the turn table, ahead of the aircraft 1 which is stationed on the turn table 7. A X-carriage 103 has wheels 102 driven by an electric motor, so that the X-carriage 103 can run along the rails 17, 17. A Y-carriage 104, which is capable of moving in the Y-direction, is mounted on the X-carriage 103. The Y-carriage 104 in turn carries a Z-carriage 105 which can move in the vertical direction. The Y- and Z-carriages 104 and 105 are guided by means of rails and wheels similar to those used for the washing devices explained hereinbefore. Similarly, a sprocket-and-chain type driving mechanism employing a hydraulic motor with a reduction gear is used for driving each of the Y- and Z-carriages 104 and 105.

A turret 106 is attached to the side of the Z-carriage 105 adjacent the turn table 7. The turret 106 is rotatable about an axis which extends in the direction of the axis of the aircraft through the center of the Z-carriage 105.

Four frame-like arms 107 are secured at their base ends to the surface of the turret 106 at 90° intervals such as to extend towards the nose 4 of the aircraft. These arms 107 are pivotable in the radial direction of the turret 106 and carry washing units 24 at their free ends. An electric motor 110 drives a pinion 109 which meshes with a gear 108 attached to the rear surface of the turret 106 coaxially therewith, so that the turret 106 can be rotated by a predetermined angle. The angle of each arm 107 with respect to the turret 106 is adjusted by means of a rod 111 which is driven by an electric motor so that the size of the area surrounded by the washing units 24 on four arms 107 can be varied as desired. In FIG. 19, a reference numeral 112 denotes an operation cab where an electric equipment for controlling the nose washing device 18 is installed.

Although not shown, a nose end detecting device, which is adapted to be moved towards the nose of the aircraft by means of a telescopic mechanism, is mounted on the center of the nose washing device 18. As will be explained later, the nose end detecting device detects the position of the end of the nose, as well as the height and the offset of the longitudinal axis, of the aircraft which has been brought onto the turn table. The thus detected values are inputted to a control system together with various data including the geometrical shape and size which are prepared beforehand for each type of the aircraft to be washed. Using these values and data, the control system automatically controls the movement of the washing devices such that the washing units carried by these washing carriages can wash the surface of the aircraft following up the configuration of the aircraft.

The aircraft washing apparatus of the invention described hereinbefore operates in a manner which will be explained hereinunder.

The aircraft 1 to be washed is brought onto the turn table 7 and is stationed such that its longitudinal axis extends in parallel with the main washing carriage 8 as shown by two-dot-and-dash line in FIG. 1, with its main wheels fixed by means of stoppers on the turn table. The nose wheel of the aircraft rests on a suitable truck 113 which is capable of running on the ground. Then, the nose washing device 18 having the nose end detecting device is moved along the rails 17 towards the nose 4, so that the nose end detecting device can detect the position of the nose end of the aircraft 1, as well as the height and offset of the axis of the aircraft. After the detected values are inputted to a computer, the head washing device is retracted and its Y- and Z-carriages are moved such that the axis of rotation of the turret 106 is aligned with the axis of the aircraft. Then, the nose washing device 108 is moved ahead towards the nose and starts to wash the nose 4 of the aircraft.

Meanwhile, the main carriage 8 is moved along the rails 10 in the Y-direction towards the aircraft to the most advanced position shown by two-dot-and-dash line in FIG. 1, where the apparatus starts to wash the fuselage 3 and the vertical and horizontal tail planes 5. More specifically, in the upper fuselage washing device 11, the positions of the Y-carriages 22 and the Z-carriages 23, as well as the angles of the rotary brushes 37, are adjusted such that six washing units 24 are suitably arranged over the area between the top of the fuselage 3 and the side of the same adjacent to the washing apparatus. The brushes 37 start to rotate as they are brought into contact with the surface to be washed and, at the same time, jetting of water from the nozzles is commenced. In this state, the X-carriage 19 reciprocates several times along the main washing carriage 8 substantially over the entire length of the fuselage 3 of the aircraft 1, thereby washing the upper half part of the side surface of the aircraft fuselage 3 adjacent the washing apparatus.

The lower half part of the same side of the aircraft fuselage 3 is washed by a pair of lower fuselage washing devices 12 as explained before: namely, a device 12 for washing the front portion and a device 12 for washing the rear portion of the fuselage. In each lower fuselage washing device 12, the position of each Z-carriage 45 and the position of each Y-carriage 52, as well as the angle of each rotary brush 37, are adjusted such that two washing units 24 are suitably disposed on the lower portion of the side surface of the aircraft fuselage 3. Then, the X-carriage 42 of the washing device 12 for the front part reciprocates several times between a predetermined position near the nose and the position where the leading edge of the main wing is located, thus washing the front part of the lower side surface of the aircraft fuselage 3. Similarly, the X-carriage 42 of the washing device 12 for the rear part reciprocates several times between the tail end and the position where the trailing edge of the main wing is located, thus washing the rear part of the lower side surface of the aircraft fuselage 3. Any area which could not be washed by the reciprocatory washing operation of the upper and lower fuselage washing devices 11 and 12 can then be washed by conducting the same washing strokes after changing the positions and angles of the washing units.

During the washing of the aircraft fuselage 3 by the upper and lower washing devices 11 and 12, the X-carriages 84 and 96 of the vertical and horizontal tail plane upper surface washing device 15 and the tail plane lower surface washing device 16 which are positioned at the right end of the apparatus as viewed in FIG. 1 made several reciprocatory strokes in the right end portion of the main carriage 8, so that the vertical and horizontal tail planes 5 are washed. In order to wash the vertical tail plane and the horizontal tail plane, the positions of the carriages such as the Y- and Z-carriages 85 and 87 for the vertical tail plane, Z- and Y-carriages 90 and 91 for the upper surface of the horizontal tail plane, and the Z- and Y-carriages 98 and 99 for the lower surface of the horizontal tail plane, as well as the angles of respective rotary brushes 37, are adjusted in conformity with the surfaces to be washed. In the tail plane lower surface washing device 16, the Z-carriage 98 and the Y-carriage 99 make a reciprocatory rotary motion within a horizontal plane with respect to the X-carriage 96, while the X-carriage 96 makes a reciprocatory rectilinear motion, so that each of two washing units makes a reciprocatory motion with a stroke which coincides with the width of the washing region of the horizontal tail plane to be covered by each washing unit. After the washing of the region covered by two washing units on each of the vertical and horizontal tail plane upper surface washing device and the tail plane lower surface washing device, the positions of these washing units are shifted and the same washing operation is carried out to complete the washing of the whole area of the vertical and horizontal tail plane adjacent the main washing carriage 8.

Subsequently, the main washing carriage 8 moves back by a step in the Y-direction away from the aircraft fuselage 3, and is stationed for washing the upper and lower surfaces of the main wing. The washing of the main wing is conducted in accordance with the following procedure.

First of all, the table lifters 64 and 75 of the main wing upper surface washing device 13 and the main wing lower surface washing device 14 mounted on the main washing carriage 8 are extended and the tilting angles of the tiltable booms 62 and the tiltable bar 78 are adjusted in conformity with the gradient of the upper and lower surfaces of the main wing to be washed so that the rotary brushes 37 are brought into contact with the surfaces to be washed and then start to rotate. The jetting of the washing water is commenced simultaneously. The X-carriages 59 and 70 of both washing devices perform several reciprocating strokes along the rails 57 and 71' in the X-direction over the width of the main wing 2. While the main washing carriage 8 is stationed at this position, the Y-carriage 63 of the main wing upper surface washing device 13 is shifted in the Y-direction by a distance which is equal to the space between the adjacent rotary brushes 37, and the X-carriage of this device is moved reciprocatingly thereby washing the new areas of the upper surface of the main wing. Subsequently, the main washing carriage 8 moves back away from the aircraft fuselage 3 by a further step, thereby enabling both washing devices 13 and 14 to wash the new regions of the upper and lower surfaces of the main wing adjacent the regions which have been just washed. Thus, successive regions of the upper and lower surfaces of the main wing are washed while the main washing carriage 8 moves back step by step, and the tip of this main wing is the final portion to be washed.

Engines 6 hanging from the underside of the main wing have complicated shapes which make the automatic washing difficult. In addition, the washing of a certain portion of the engine should be prohibited. Therefore, the Y-carriage 77 on the X-carriage 70 of the main wing lower surface washing device 14, when it is brought to the position of an engine 6 during the movement back, is moved in the Y-direction such as to avoid the engine 6.

The nose washing device 18 is moved forward so as to wash the nose 4 of the aircraft, while the fuselage 3, the vertical and horizontal tail planes 5 and the main wing 2 are being washed in the manner as described hereinbefore.

When the nose washing device 18 moves forward with its rotary brushes held in contact with the surface of the nose 4, the arms 107 are pivotally moved by virture of the pivot mechanism in conformity with the configuration of the nose, so that the rotary brushes 37 are moved forward in conformity with the contour of the nose, i.e., in contact with the surface of the nose 4 of the aircraft. Similarly, when the nose washing device 18 is moved to the rear, the rotary brushes 37 are moved to the rear while being held in contact with the nose surface.

After completion of one reciprocal washing stroke, the turret 106 is rotated 30° to bring the rotary brushes 37 to new positions around the nose 4. Then, the nose washing device 18 makes one reciprocatory washing stroke such as to wash the new areas of the nose surface. Then, the turret 106 is again rotated 30° so that the remaining regions on the nose surface are washed. It is thus possible to wash the whole area of the nose surface by three reciprocatory washing strokes performed by the nose washing device 18.

After the completion of the washing of the half of the aircraft as mentioned above, the nose washing device 18 and the main washing carriage 8 are moved back to their starting positions. Then, the turn table 7 rotates 180° so that the aircraft 1 is turned such that its nose 4 and the vertical and horizontal tail planes 5 are disposed at the right and left sides, respectively, as partially seen in FIG. 1.

Then, the main washing carriage 8 is advanced again and the washing devices operate in the same manner as explained before, so that the unwashed half of the fuselage 3, as well as the unwashed main wing, the unwashed horizontal tail plane and also the unwashed side of the vertical tail plane are washed. In this case, needless to say, the washing of the vertical and horizontal tail planes is conducted by washing devices 15 and 16 disposed at the left end of the apparatus. During this washing operation, the portions which cannot be accessed by the washing apparatus, e.g., the engine covers of the engines 6 and the lower surface of the fuselage adjacent the main wings, are washed by manual work or by means of specific washing mobile vehicles which are controlled individually by operators.

After the completion of the washing of the whole surface of the aircraft, the main wheel are relieved from stoppers on the turn table and the truck 113 is disengaged from the nose wheel. The aircraft 1 is then towed off out of the turn table 7 in the direction reverse to the direction of movement onto the turn table.

The data concerning the aircraft to be washed such as the shape and size of the aircraft, as well as the position of the nose end and the height and offset of the axis of the aircraft, are stored in a computer, so that the series of washing operations of all washing devices mounted by the main washing carriage 8, as well as the operation of the nose washing device 18, can be conducted fully automatically under computer control.

As will be understood from the foregoing description, according to the invention, the fuselage, main wings, vertical and horizontal tail planes and the nose of an aircraft can be washed up by the cooperation between a main washing carriage carrying various washing devices capable of washing one side of the aircraft, nose washing device on the ground and a turn table which carries the aircraft during washing, such that, after washing of one side of the aircraft, the turn table is turned 180° to make the other side of the aircraft accessible by the washing apparatus. Thus, the washing can be completed in two washing cycles, so that the time required for the washing can be reduced remarkably as compared with the prior art washing apparatus. In addition, the apparatus as a whole has a simple arrangement consisting of one turn table and one main washing carriage which carries washing devices which are required to wash only one side of the aircraft.

Thus, the present invention offers an advantage in that it provides an aircraft washing apparatus which can meet the demand of the field concerned.

What is claimed is:

1. A method of washing an aircraft comprising:
bringing said aircraft onto a turn table situated on the ground and stationing said aircraft on said turn table such that at least main wheels of said aircraft rest on said turn table;
moving a main washing carriage in the direction perpendicular to the axis of the aircraft, said main washing carriage being disposed at one side of said aircraft on said turn table and carrying a plurality of washing devices which are movable in the longitudinal direction of said main washing carriage and provided with washing units accessible to predetermined different regions of the surface of said aircraft, thereby washing at once said regions on one side of said aircraft adjacent said main washing carriage by means of said washing devices;
moving said main washing carriage to a position away from said aircraft;
turning said turn table carrying said aircraft 180°; and
moving said main washing carriage again towards said aircraft thereby allowing said washing devices to wash at once said regions on the unwashed side of said aircraft.

2. An apparatus for washing an aircraft comprising:
a turn table situated on the ground and capable of turning while carrying at least main wheels of said aircraft on predetermined positions thereon;
a main washing carriage having a length substantially equal to the length of said aircraft and disposed at one side of said turn table so as to extend in parallel with the axis of said aircraft carried by said turn table, said main washing carriage being movable in the direction perpendicular to the axis of said aircraft towards and away from said aircraft; and
a plurality of washing devices carried by said main washing carriage for movement in the longitudinal direction of said main washing carriage, said washing devices having washing units accessible to predetermined different regions of the side of said aircraft adjacent said main washing carriage; whereby a half area of said aircraft can be washed by a single washing operation of said washing devices and, after 180° turning of said turn table, the other half part is washed in the same way.

3. An apparatus for washing an aircraft according to claim 2, wherein each of said washing devices having at least one X-carriage capable of running on said main washing carriage in the longitudinal direction of said main washing carriage, and means carried by said X-carriage for supporting at least one washing unit for movement in vertical and horizontal directions perpendicularly to the axis of said aircraft.

4. An apparatus for washing an aircraft according to claim 3, wherein said washing unit has a rotary brush rotatable about a rotation axis which extends perpendicularly to the direction of running of said X-carriage.

5. An apparatus for washing an aircraft according to claim 4, wherein the angle of said rotation axis with respect to said X-carriage is adjustable.

6. An apparatus for washing an aircraft according to any one of claims 4 or 5, wherein said washing unit is provided with a washing water jetting means arranged in the vicinity of said rotary brush.

7. An apparatus for washing an aircraft according to claim 5, wherein said different regions to be washed by said washing devices on said main washing carriage are the upper fuselage, lower fuselage, upper surface of a main wing, lower surface of said main wing, upper surface of a horizontal tail plane and one side of a vertical tail plane, and the lower surface of said horizontal tail plane.

8. An apparatus for washing an aircraft according to claim 7, wherein the washing device for washing the upper fuselage of said aircraft includes a X-carriage capable of running on said main washing carriage in the longitudinal direction of said main washing carriage along the upper half part of the side of said main washing carriage adjacent said turn table except both longitudinal end portions of said main washing carriage, a plurality of Y-carriages arranged in the X-direction on said X-carriage and suspended therefrom so as to move in the horizontal direction perpendicular to the axis of said aircraft, a Z-carriage carried by each Y-carriage for movement in the vertical direction, and a washing unit pivotally secured to the free end of each Z-carriage.

9. An apparatus for washing an aircraft according to claim 7, wherein the washing device for washing the lower fuselage of said aircraft includes a pair of X-carriages capable of running on said main washing carriage in the longitudinal direction of said main washing carriage along two regions of the lower half part of the side of said main washing carriage adjacent said turn table except both longitudinal end portions of said main washing carriage and the portion of said main washing carriage corresponding to said main wing, a plurality of Z-carriages arranged in the X-direction on said X-carriage and movable in the vertical direction, a Y-carriage carried by each Z-carriage for movement in the horizontal direction perpendicular to the axis of said aircraft, and a washing unit pivotally secured to the free end of said Y-carriage.

10. An apparatus for washing an aircraft according to claim 7, wherein the washing device for washing the upper surface of the main wing includes a X-carriage capable of running on said main washing carriage in the longitudinal direction thereof along the lower side of an intermediate portion of said main washing carriage, a tiltable boom pivotally secured to the underside of said X-carriage for tilting motion about a pivot axis extending in the X-direction, a Y-carriage mounted on said tiltable boom for movement in the direction perpendicular to the axis of said aircraft, a plurality of vertically extensible and contractable table lifters secured to the underside of said Y-carriage such that the adjacent table lifters are spaced from each other by a predetermined distance in the direction of movement of said Y-carriage, and a washing unit secured to the underside of each table lifter.

11. An apparatus for washing an aircraft according to claim 7, wherein the washing device for washing the lower surface of the main wing includes a plurality of X-carriages capable of running on a plurality of parallel paths formed on a frame supported by the lower portion of said main washing carriage near the ground surface so as to extend in parallel with the ground surface, a vertically extensible and contractable table lifter carried by each X-carriage, a Z-carriage mounted on said table lifter, a Y-carriage carried by said Z-carriage for movement in the direction perpendicular to the axis of said aircraft, a tiltable boom secured to said Y-carriage for tilting motion about a pivot axis extending in the X-direction, and a washing unit secured to said tiltable boom.

12. An apparatus for washing an aircraft according to claim 7, wherein the washing device for washing the upper surface of a horizontal tail plane and one side of a vertical tail plane includes a pair of X-carriages disposed on each longitudinal end of said main washing carriage and capable of running along the side surface of said main washing carriage adjacent said turn table at each end portion of said main washing carriage, a Y-carriage for the vertical tail plane suspended from the upper side of each X-carriage for movement in the horizontal direction perpendicular to the axis of said aircraft, a Z-carriage carried by said Y-carriage for the vertical tail plane for movement in the vertical direction, a tiltable boom secured to said Z-carriage for tilting movement about a pivot axis extending in the X-direction, a plurality of washing units for the vertical tail plane arranged in the direction of movement of said tiltable boom and secured to said tiltable boom, a Z-carriage for the upper surface of the horizontal tail plane carried by each X-carriage for movement in the vertical direction, a Y-carriage carried by said Z-carriage for the upper surface of the horizontal tail plane for movement in the horizontal direction perpendicular to the axis of said aircraft, a tiltable boom secured to said Y-carriage for a tilting movement about a pivot axis which extends in the X-direction, and a plurality of washing units for the upper surface of said horizontal tail plane arranged in the direction of movement of said tiltable boom and secured to said tiltable boom.

13. An apparatus for washing an aircraft according to claim 7, wherein the washing device for washing the lower surface of the horizontal tail plane includes a pair of X-carriages disposed on each longitudinal end of said main washing carriage and capable of running along the lower surface of said main washing carriage at each end portion of said main washing carriage, a frame suspended from the underside of each X-carriage for rotation about a vertical axis, a X-carriage carried by said frame for movement in the vertical direction, a Y-carriage mounted on said Z-carriage for radial movement around said frame, a tiltable boom secured to said Y-carriage for tilting movement about a pivot axis perpendicular to the direction of movement of said Y-carriage, and a plurality of washing units arranged in the direction of movement of said tiltable boom and secured to said tiltable boom.

14. An apparatus for washing an aircraft according to claim 7, further comprising a nose washing device adapted to move on the ground towards and away from the nose of said aircraft on said turn table along the line which is an extension of the axis of said aircraft, such as to wash the nose of said aircraft.

15. An apparatus for washing an aircraft according to claim 14, wherein said nose washing device includes an X-carriage adapted to run along rails which are laid on the ground on the extension of the axis of said aircraft on said turn table, a Y-carriage carried by said X-carriage for movement in the direction perpendicular to the axis of said aircraft, a Z-carriage carried by said Y-carriage for movement in the vertical direction, a turret mounted on said Z-carriage for rotation about an axis parallel to the axis of said aircraft, a plurality of arms pivotally secured to said turret at a predetermined angular interval such as to extend towards the nose of said aircraft on said turn table, said arms being pivotable about axes perpendicular to the radii of said turret, and a rotary brush secured to the free end of each arm and rotatable about an axis parallel to the pivot axis of said arm.

* * * * *

UNITED STATES PATENT AND TRADEMARK OFFICE
CERTIFICATE OF CORRECTION

PATENT NO. : 4,668,301
DATED : May 26, 1987
INVENTOR(S) : NOBORU TAKIGAWA ET AL

It is certified that error appears in the above-identified patent and that said Letters Patent is hereby corrected as shown below:

On the cover page, Item [75], after "Katsumi Kawase", insert --- Yokosuka ---; and change "Higaken" to --- Higaki ---.

Signed and Sealed this

Fifteenth Day of December, 1987

Attest:

DONALD J. QUIGG

Attesting Officer          Commissioner of Patents and Trademarks